J. B. BRENNAN.
MACHINE FOR AND METHOD OF MAKING CORD TIRE STOCK.
APPLICATION FILED JUNE 9, 1919.

1,418,906.

Patented June 6, 1922.

INVENTOR
Joseph B. Brennan
by MacLeod, Calver, Copeland Attys.
Attys.

UNITED STATES PATENT OFFICE.

JOSEPH B. BRENNAN, OF LEXINGTON, MASSACHUSETTS.

MACHINE FOR AND METHOD OF MAKING CORD-TIRE STOCK.

1,418,906. Specification of Letters Patent. Patented June 6, 1922.

Application filed June 9, 1919. Serial No. 302,833.

*To all whom it may concern:*

Be it known that I, JOSEPH B. BRENNAN, a citizen of the United States, residing at Lexington, county of Middlesex, State of Massachusetts, have invented a certain new and useful Improvement in Machines for and Methods of Making Cord-Tire Stock, of which the following is a specification, reference being had therein to the accompanying drawings.

My invention has for its object a new and improved machine for making, automatically and in continuous strips, the tire stock described herein. This tire stock is used in the manufacture of pneumatic tires.

The invention will be fully understood from the following description when taken in connection with the accompanying drawings, and the novel features thereof will be pointed out and clearly defined in the claims at the close of this specification.

In the drawings, Fig. 1 is a side elevation partly broken away of a tire stock machine embodying my invention.

Figure 1:
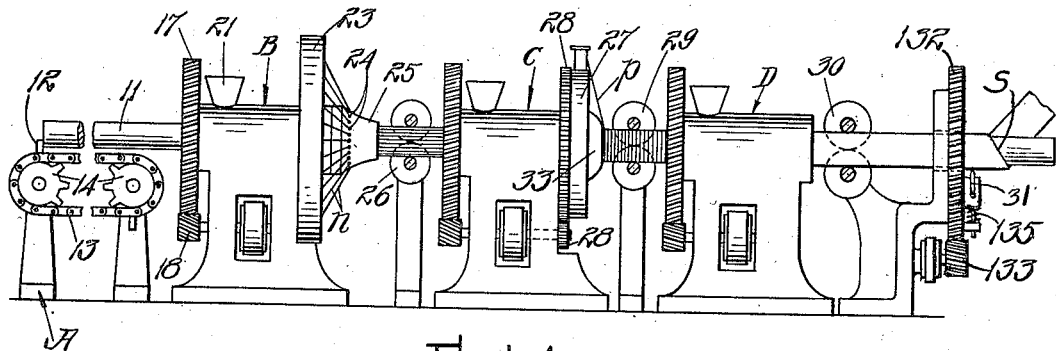
Figures 2, 3, 4:
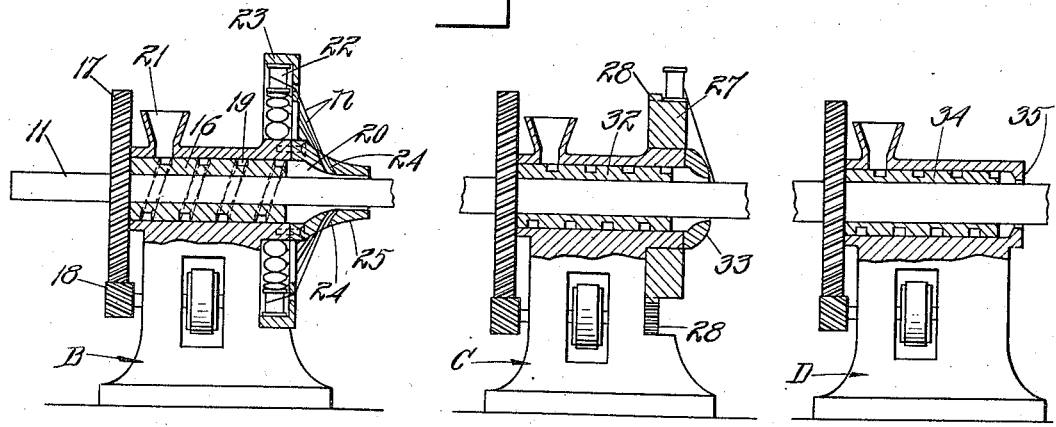
Fig. 2 is a vertical section of a portion of the machine designated B.
Fig. 3 is a vertical section of a portion of the machine designated C.
Fig. 4 is a vertical section of a portion of the machine designated D.
Figure 5:
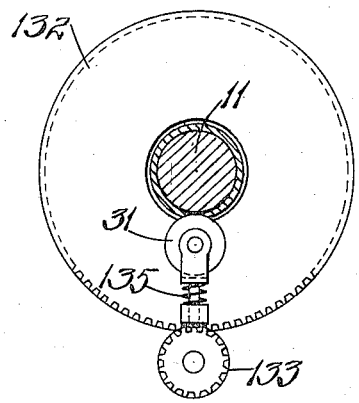
Fig. 5 is a detail of the knife-operating mechanism.
Figure 6:
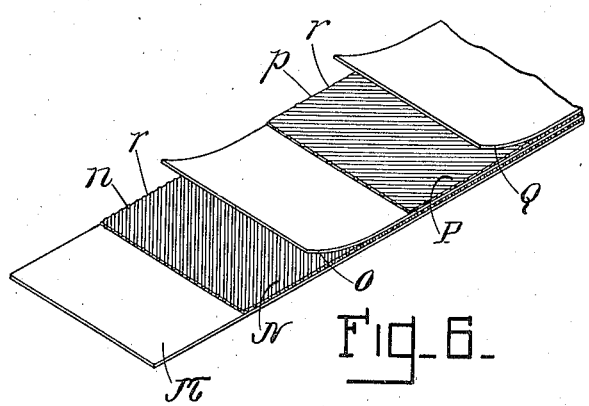
Fig. 6 is a diagrammatical view of the tire stock to be produced.

The tire stock to be produced consists preferably of five layers, M, N, O, P and Q. The layers N and P are composed of cords $n$ and $p$ respectively. The adjacent cords in each layer are separated from each other by gum, as indicated at $r$. The cords in the two layers N and P are laid crosswise of each other preferably at an angle of 90°. These two layers of cord are enclosed by layers of gum M, O and Q. The layers Q and M form the top and bottom faces of the tire stock while the layer O is located between the two layers N and P of cords. The result of this construction is that each cord is completely surrounded by a layer of gum which cushions and protects the cord. This tire stock may be used in building up a tire in exactly the same manner as frictioned fabric is employed.

The machine shown herein constructs strips of this tire stock in continuous length by forming a tube and then slitting the tube on the bias.

The machine consists of a series of groups of instrumentalities which perform successive operations in the formation of the tube on a mandrel which moves forward through the machine. The mandrel is shown at 11. It is pushed forward at a predetermined rate of speed by a projection 12 carried on an endless chain 13 which is revolved by sprockets 14. The parts so far described compose the first group of mechanism which is designated A. The second group of mechanism which is designated B, serves to lay a layer of gum around the peripheral surface of the mandrel. It consists of a revolving stuffing worm 16 moved by gears 17 and 18. It forces the gum forward through a passage 19 into a space 20 between the mandrel 11 and a nozzle 25. The gum is introduced through the hopper 21. As the mandrel 11 is forced forward, the cords $n$ are fed from spools 22 mounted in a ring 23. These cords pass through holes 24 in the nozzle 25 and are laid parallel with each other and lengthwise of the mandrel 11, but are out of contact with each other. After the cords emerge from the nozzle 25, they may be subjected to pressure by rolls 26 which slightly embed them in the layer of gum M which was first laid on the mandrel.

The mandrel then passes through the third group of instrumentalities C. This consists of another stuffing worm 32 and nozzle 33 which lays the layer of gum O outside the first layer of cords and a revolving spool carrier 27, driven by gears 28, which winds the cord $p$ around and around the mandrel. Pressure may then be applied by the rolls 29, and the mandrel then passes through the fourth group of instrumentalities D. This also includes a stuffing worm 34 and nozzle 35 which lays the outside or top layer Q of gum. A pair of rolls 30 then applies pressure to the exterior of the stock on the mandrel.

The stock is then slit spirally along the line S by a knife 31, which is yieldingly mounted on a worm gear 132 through a hole in the center of which the mandrel 11 is fed. The worm gear 132 is driven with a predetermined speed relative to the other parts of the machine, by a worm 133. The knife 31 is thus carried around the mandrel 11 and is held at all times against the stock by means of a spring 135.

What I claim is:—

1. The method of making tire stock which consists in forming a tube of two layers of frictioned cord, one of said layers being parallel with the axis of the tube and the other of said layers of cord being at substantially right angles to the first of said layers and then slitting the tube on an acute angle to the cords forming both layers.

2. The method of making tire stock which consists in forming a tube of two layers of frictioned cord, one of said layers being parallel with the axis of the tube and the other of said layers of cord being at substantially right angles to the first of said layers and then slitting the tube along the line on the bias with both layers of cord.

3. The method of making tire stock which consists in laying a layer of gum on a mandrel, superposing upon said layer two layers of cord, one of which is parallel with the axis of the mandrel and the other of which is at right angles to the axis of the mandrel, said layers being separated from each other by a layer of gum, and then laying a layer of gum over the exterior layer of cord and slitting the tube thus formed.

4. A machine for making tire stock comprising a longitudinally movable mandrel, mechanism for laying a coating of gum on the said mandrel, mechanism for superposing a layer of parallel cords thereon, mechanism for laying a layer of circumferential cords, and mechanism for slitting the tube thus formed.

5. An improved machine for making tire stock comprising a longitudinally movable mandrel, mechanism for laying a coating of gum on the mandrel, two groups of mechanism one of which lays cords lengthwise of the mandrel and the other of which winds cords circumferentially of the mandrel, and mechanism for laying a layer of gum between said two layers of cord, said mechanism being located between the two cord-laying mechanisms.

In testimony whereof I affix my signature.

JOSEPH B. BRENNAN.